3,652,705
PROCESS FOR THE OLIGOMERIZATION OF ETHYLENE
Takaaki Arakawa and Kenji Saeki, Iwakuni-shi, Yoshikuni Sato, Otake-shi, and Yoriya Kitazawa, Wakimura, Japan, assignors to Mitsui Petrochemical Industries, Ltd., Tokyo, Japan
No Drawing. Filed Sept. 29, 1969, Ser. No. 862,029
Claims priority, application Japan, Oct. 3, 1968, 43/71,612, 43/71,613, 43/71,614, 43/71,616; Feb. 25, 1969, 44/13,605, 44/13,606; Mar. 25, 1969, 44/22,043
Int. Cl. C07c 3/10
U.S. Cl. 260—683.15 D
6 Claims

ABSTRACT OF THE DISCLOSURE

A process for the preparation of higher olefins by oligomerization of ethylene, which comprises contacting ethylene with a catalyst in a solvent at temperatures ranging from −30 to +80° C., the catalyst being prepared by the steps of reacting titanium tetrachloride with at least one electron donor selected from the group consisting of tertiary phosphines, ketones, esters, nitriles, ethers, amines, and organic sulfur compounds, and mixing the reaction product with an aluminum alkyl halide component containing 1.8–2.8 bonded halogen atoms per one aluminum atom.

---

This invention relates to a process for the preparation of higher olefins of 8–20 carbon atoms of high linearity, which are useful as the starting materials of plasticizers and detergents, with high selectivity, by oligomerization.

It is known that the catalyst system composed of titanium tetrachloride and dialkyl aluminum halide is useful for polymerizing ethylene to make high molecular weight polyethylene, and the binary catalyst system composed of titanium tetrachloride and alkyl aluminum dichloride serves to polymerize ethylene to make higher olefins. However, with the latter catalyst the degree of polymerization of ethylene is still relatively high, and most of the product is a waxy polyolefin of a molecular weight not lower than 300. Thus, the latter polymerization method is unsatisfactory as an industrial means for making higher olefins of 8 to 20 carbons which are useful as the starting materials of plasticizers and detergents.

Research has long been conducted to develop a process for the oligomerization of ethylene to produce linear higher olefins of 8–20 carbons with high yield. It has now been discovered that the catalyst system prepared by adding an alkyl aluminum halide component to the reaction product of titanium tetrachloride with at least one specific electron donor is particularly effective for the synthesis of linear higher olefins of 8–20 carbons through the oligomerization of ethylene. Furthermore, it has been discovered that since the specified catalyst gives the higher olefins of greatly improved linearity over those obtained using the binary catalyst of titanium tetrachloride and alkyl aluminum dichloride, the catalyst of the present invention is extremely useful in the synthesis of starting material for soft synthetic detergents.

According to the invention, a process for the preparation of higher olefins by oligomerization of ethylene is provided, which comprises contacting ethylene with a catalyst in a solvent at temperatures ranging from −30 to +80° C., the catalyst being prepared by the steps of reacting titanium tetrachloride with at least one electron donor selected from the group consisting of tertiary phosphines, ketones, esters, nitriles, ethers, amines, and organic sulfur compounds, and mixing the reaction product with an aluminum alkyl halide component containing 1.8–2.8 atoms of bonded halogen atoms per one aluminum atom.

The catalyst employed in the subject process is prepared by the following procedures.

First, at least one compound selected from the group consisting of tertiary phosphines, ketones, esters, nitriles, ethers, amines and organic sulfur compounds is reacted with titanium tetrachloride ($TiCl_4$) to form a complex compound. The reaction progresses by maintaining the solvent, in which $TiCl_4$ and electron donor are concurrently present, at −20 to +100° C., preferably 0–50° C. for approximately 5–60 minutes. When an organic sulfur compound is used as the electron donor, it is preferred that the reaction temperature should range from 20 to 80° C.

The catalyst of the invention is prepared by mixing the obtained complex of $TiCl_4$ and electron donor with a aluminum alkyl halide component containing 1.8–2.8 bonded halogen atoms per one aluminum atom. As the aluminum alkyl halide component containing 1.8–2.8 bonded halogen atoms per one aluminum atom, for example, the following alkyl aluminum dihalides are preferably used: methylaluminum dichloride, ethylaluminum dichloride, ethylaluminum dibromide, propylaluminum dichloride, butylaluminum dichloride, etc. It is also permissible to mix more than one of such alkyl aluminum dihalides. Also mixtures of trialkyl aluminum, dialkyl aluminum halide, alkyl aluminum sesquihalide, alkyl aluminum dihalide, aluminum trihalide, etc., containing 1.8–2.8 bonded halogen atoms per one aluminum atom may be used.

It is important for the preparation of catalyst used in this invention, to react $TiCl_4$ with the electron donor prior to mixing with the alkyl aluminum halide. If the three components are simply mixer, or the electron donor is first reacted with ethyl alkyl aluminum halide component and thereafter mixed with $TiCl_4$, the resulting catalysts show only negligible activity.

According to the invention, the tertiary phosphines to be reacted with titanium tetrachloride are the compounds represented by the general formula,

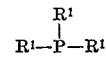

in which $R^1$, represents an alkyl of 1–5 carbon atoms or an aryl of 6–8 carbon atoms. ($R^1$'s may be same or different.) More specifically, $R^1$ may be methyl, ethyl, isopropyl, phenyl, etc. Particularly preferred tertiary phosphines are those of high basicity, such as trialkyl phosphines including trimethyl phosphines, triethyl phosphine, triisopropylphosphine, etc., and triphenyl phosphine.

Also the ketones to be reacted with titanium tetrachloride include monoketones of the general formula

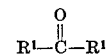

and diketones of the general formula

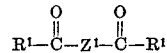

in which $R^1$ represents an alkyl of 1–5 carbon atoms, or aryl of 6–8 carbon atoms ($R^1$'s may be same or different), and $Z^1$ represents an alkylene of 1–3 carbon atoms. More specifically, $R^1$ may be methyl, ethyl, isopropyl, phenyl, and the like, and $Z^1$ may be methylene, ethylene, and the like. Particularly dialkyl ketones such as acetone, ethyl methyl ketone, diethyl ketone, diisopropyl ketone; alkyl aryl ketones such as acetophenone; and β-diketones such as acetylacetone, are preferred for their strong electron donating property.

As the esters to be reacted with titanium tetrachloride in accordance with the invention, monoesters of the general formula

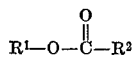

and diesters of the general formula

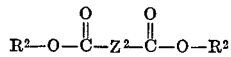

may be used, in which $R^1$ represents an alkyl of 1–5 carbon atoms or an aryl of 6–8 carbon atoms; $R^2$ represents an alkyl of 1–5 carbon atoms, an aryl of 6–8 carbon atoms, or hydrogen ($R^2$'s may be same different); and $Z^2$ represents an alkylene or 1–4 carbon atoms or arylene of 6–8 carbon atoms. More specifically, $R^1$'s may be methyl, ethyl, propyl, butyl, amyl, phenyl, and methyl-substituted phenyl, etc.; $R^2$ may be hydrogen, methyl, ethyl, propyl, phenyl, etc.; and $Z^2$ may be methylene, ethylene, phenylene, etc. Particularly preferred esters are those of aliphatic monocarboxylic acids such as methyl formate, ethyl formate, propyl formate, butyl formate, methyl acetate, ethyl acetate, propyl acetate, butyl acetate, amyl acetate, methyl propionate, methyl butyrate, ethyl butyrate, and phenyl acetate, etc.; esters of aromatic monocarboxylic acids such as methyl benzoate, ethyl benzoate, etc.; esters of aliphatic dicarboxylic acids such as dimethyl oxalate, diethyl oxalate, dimethyl malonate, diethyl malonate, dimethyl succinate, diethyl succinate, etc.; and esters of aromatic dicarboxylic acids such as dimethyl phthalate, diethyl phthalate, etc.

The nitriles to be reacted with titanium tetrachloride are mononitriles of the general formula $R^3$—CN, and dinitriles of the general formula NC—$Z^1$—CN, in which $R^3$ is an alkyl of 1–5 carbon atoms, alkenyl of 2–4 carbons or aryl of 6–8 carbons; and $Z^1$ is an alkylene of 1–3 carbon atoms. More specifically, $R^3$ may be methyl, ethyl, propyl, butyl, vinyl, phenyl, etc., and $Z^1$ may be methylene, ethylene, etc. Particularly preferred nitriles are alkyl nitriles such as acetonitrile, propionitrile and valeronitrile; alkenyl nitriles such as acrylonitrile; aryl nitriles such as benzonitrile; and alkyl dinitriles such as malonitrile and adiponitrile.

The ethers to be reacted with titanium tetrachloride according to the invention include monoethers of the general formula $R^1$—O—$R^1$; allylethers of the general formula $R^1$—O—$CH_2$—CH=$CH_2$, ethers expressed as diethers of diethylene glycol of the general formula $R^1$—O—$(CH_2)_2$—O—$(CH_2)_2$—O—$R^1$, and cyclic ethers of 4 carbons such as furan, tetrahydrofuran, dioxane, etc. In the foregoing general formulae, $R^1$ represents an alkyl of 1–5 carbon atoms or an aryl of 6–8 carbon atoms ($R^1$ may be the same or different). More specifically, $R^1$ may be methyl, ethyl, propyl, butyl, phenyl, and the like. Particularly preferred ethers are dialkyl ethers such as ethyl ether, propyl ether, butyl ether, etc.; allyl alkyl ethers such as allyl ethyl ether, allyl butyl ether, etc.; alkyl aryl ethers such as anisole; cyclic monoethers such as tetrahydrofuran, and cyclic diethers such as dioxane.

The amines to be reacted with titanium tetrachloride include amines of the general formula

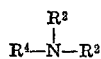

cyclic monoamines of 4–5 carbon atoms such as pyrrole, piperidine, and pyridine; and cyclic diamines of 4 carbon atoms such as piperazine. In the above general formula, $R^2$ represents an alkyl of 1–5 carbon atoms, an aryl of 6–8 carbon atoms, or hydrogen ($R^2$ may be the same or different), $R^4$ represents an alkyl of 1–5 carbon atoms, or an aryl of 6–8 carbon atoms or naphthyl, the aryl and naphthyl groups being optionally halogen-, nitro-, or carboxyl-substituted.

More specifically, $R^2$ may be hydrogen, methyl, ethyl, etc., and $R^4$ may be methyl, ethyl, propyl, butyl, amyl, phenyl, and halogen-, nitrogen-, or carboxyl-substituted phenyl, etc. Particularly preferred amines include aliphatic primary amines such as propylamine, allylamine, butylamine, and amylamine; aromatic primary amines such as aniline, toluidine, chloroaniline, aminobenzoic acid, α-naphthylamine, and β-naphthylamine; secondary amines such as N-methylaniline; tertiary amines such as trimethylamine and triethylamine; cyclic monoamines such as pyrrole, piperidine, and pyridine; and cyclic diamines such as piperazine.

The organic sulfur compounds to be reacted with titanium tetrachloride in accordance with the invention include mercaptans of the general formula $R^5$—SH; thiophenols of the general formula $R^6$—SH; thioethers of the general formula $R^1$—$S_x$—$R^1$; sulfoxides of the general formula $R^1$—SO—$R^1$; sulfones of the general formula $R^3$—$SO_2$—$R^3$; thioureas of the general formula

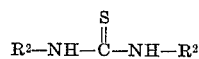

thiurams of the general formula

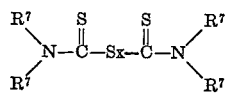

cyclic thioethers of 4 carbon atoms such as thiophene; benzothiazoles such as 2-mercaptobenzothiazole, N-cyclohexyl-2-benzothiazylsulpheneamide, etc.; and mercaptopyrimidines such as thiouracil. In the foregoing formulae, $R^1$ represents an alkyl of 1–5 carbon atoms or an aryl of 6–8 carbon atoms ($R^1$'s may be the same or different); $R^2$ represents an alkyl of 1–5 carbon atoms, an aryl of 6–8 carbon atoms, or hydrogen ($R^2$'s may be the same or different); $R^3$ represents an alkyl of 1–5 carbons, an alkenyl of 2–4 carbon atoms, or an aryl of 6–8 carbons ($R^3$'s may be the same or different); $R^5$ represents an alkyl of 1–5 carbon atoms, $R^6$ represents an aryl of 6–8 carbon atoms, $R^7$ represents an alkyl of 1–6 carbon atoms or a cycloalkyl of 4–6 carbon atoms ($R^7$'s may be the same or different); and x is an integer of 1 to 6.

More specifically, $R^1$ may be methyl, ethyl, propyl, phenyl, etc.; $R^2$ may be hydrogen; phenyl, tolyl, etc.; $R^3$ may be methyl, ethyl, vinyl, phenyl, etc.; $R^5$ may be methyl, ethyl, propyl, etc.; $R^6$ may be phenyl; and $R^7$ may be methyl, ethyl, propyl, cyclohexyl, etc.

Particularly preferred organic sulfur compounds include mercaptans such as methyl mercaptan, ethyl mercaptan, propyl mercaptan, and butyl mercaptan; thiophenol; thioethers such as ethyl sulfide, phenyl sulfide and thiophene, dimethylsulfoxide; sulfones such as dimethyl sulfone, diethyl sulfone, divinyl sulfone, and diphenyl sulfone; thioureas such as thiourea, and thiocarbanilide; thiurams such as tetramethylthiuram sulfide, tetrabutylthiuram disulfide, and dipentamethylenethiuram tetrasulfide; benzothiazoles such as 2-mercaptobenzothiazole and N-cyclohexyl-2-benzothiazylsulphenamide, and mercaptopyrimidines such as thiouracil.

The mol ratios of the components employed for the preparation of the catalyst in this invention are as follows; the compound or compounds used as the electron donor is (are) within the range of 0.1 to 5 mols, preferably 0.2 to 2 mols, per mol of titanium tetrachloride. The exception is the organic sulfur compound, and it is used within the range of 0.01–5 mols, preferably 0.02 to 2 mols, per mol of titanium tetrachloride. Also per mol of titanium tetrachloride, the alkyl aluminum halide component is used within the range of 0.3 to 50 mols, preferably 1 to 10 mols.

According to a preferred method of preparation of the catalyst using the foregoing components, first at least one of the electron donors specified in the above is added to titanium tetrachloride which is dissolved or suspended in a suitable solvent, and reacted to form a complex compound, followed by the addition of the alkyl aluminum halide component to the reaction system. The foregoing procedures may be performed in an inert gas such as nitrogen, argon, etc. As the useful solvent, aliphatic hydrocarbons such as pentane, hexane, heptane; alicyclic hydrocarbons such as cyclohexane; aromatic hydrocarbons such as benzene, toluene and xylenes; halogenated aliphatic hydrocarbons such as dichloromethane, dichloroethane, trichloroethylene; and halogenated aromatic hydrocarbons such as chlorobenzene, bromobenzene, and dichlorobenzene, etc. may be named. Particularly preferred solvents are aromatic hydrocarbons and halogenated aromatic hydrocarbons, inter alia, toluene and chlorobenzene.

The oligomerization of ethylene can be performed by blowing ethylene into a solvent in which the catalyst is dissolved or suspended. The reaction temperature suitably ranges from −30 to +80° C., preferably from −20 to +30° C. The reaction progresses under any pressure condition such as atmospheric, reduced or elevated, but the most favorable result can be obtained through the reaction under atmospheric to elevated pressure of up to 50 kg./cm.$^2$. When the reaction conditions are so selected that the ethylene to be polymerized is maintained at liquid state, it is possible to use the ethylene also as the solvent. In that case the reaction is performed without using an additional solvent.

The suitable blowing rate of ethylene ranges approximately from 4–300 liter/hr. N.T.P. (normal state) per millimol of titanium tetrachloride, and suitable reaction time ranges from 5 to 180 minutes.

When ethylene is polymerized in the presence of the catalyst prepared as above, higher olefins in the order of the tetramer to decamer of ethylene of high linearity are selectively formed, with little formation of unnecessary waxy polyethylene. Furthermore, since the reaction can be performed under mild conditions, the industrial advantages in which respect to operation and apparatus of the process are indeed great.

Hereinafter the process of the invention will be explained in further detail, referring to the following working Examples, in which the measurement of carbon numbers in the reaction products was performed by means of conventional gas chromatography.

The term, "linearity" is defined as the number of branches per 100 carbons in the reaction product. Thus, if the reaction product consists solely of $C_{10}$ olefin, "linearity of 95%" means that a total of five branches are present in ten molecules of $C_{10}$ olefin. The measurement of linearity in the examples was in all cases performed by gas chromatography.

EXAMPLE 1

A nitrogen-substituted, 300-ml. capacity glass reactor provided with a stirrer, an ethylene gas inlet tube and a thermometer was charged with 100 ml. of chlorobenzene as the solvent, and 5 millimols of titanium tetrachloride were dissolved therein. The temperature in the reactor were lowered to −20° C. and then 5 millimols of a tertiary phosphine as specified in Table 1 was added as the electrondoner in each run. After 15 minutes reaction under thorough stirring, 15 millimols of ethylaluminum dichloride were added. Upon completion of the catalyst preparation as above, ethylene gas was introduced into the reactor at a pressure slightly higher than the atmospheric level (approximately 50–200 mm. of mercury). The temperature was gradually raised and the reaction was performed for the time indicated in Table 1, at 0° C. The results are given in Table 1. As controls, the results of ethylene polymerization with the use of catalyst prepared without any electron donor are concurrently given in the same table.

TABLE 1

| Run No. | Tertiary phosphines | Polymerization reaction time (min.) | Yield (g.) | | | Selectivity for $C_8$–$C_{20}$ percent | Linearity percent |
| --- | --- | --- | --- | --- | --- | --- | --- |
| | | | —$C_6$ | $C_8$–$C_{20}$ | $C_{22}$— | | |
| 1 | Triethyl phosphine | 90 | 2.3 | 60.0 | 6.9 | 86.9 | 94 |
| 2 | Triisopropyl phosphine | 90 | 0.6 | 25.3 | 3.9 | 84.9 | 98 |
| 3 | Triphenyl phosphine | 90 | 1.4 | 23.9 | 1.7 | 88.5 | 98 |
| 4 (Control) | | 120 | 1.5 | 40.8 | 33.0 | 54.2 | 84 |
| 5 (Control) [1] | | 65 | 0.4 | 4.3 | 26.1 | 14.0 | 75 |

[1] In the Run No. 5 (control), 77 millimols of ethylaluminum dichloride were added.

EXAMPLE 2

Example 1 was repeated except that the tertiary phosphines used as the electron doner were replaced by 10 millimols of ketones specified in Table 2 in each run. The results of ethylene polymerizations were as given in Table 2.

TABLE 2

| Run No. | Ketones | Polymerization reaction time (min.) | Yield (g.) | | | Selectivity for $C_8$–$C_{20}$ percent | Linearity percent |
| --- | --- | --- | --- | --- | --- | --- | --- |
| | | | —$C_6$ | $C_8$–$C_{20}$ | $C_{22}$— | | |
| 1 | Dimethylketone | 90 | 0.8 | 25.3 | 3.9 | 84.3 | 91 |
| 2 | Ethyl methylketone | 90 | 1.3 | 23.0 | 4.0 | 81.4 | 96 |
| 3 | Diethylketone | 70 | 1.5 | 18.7 | 2.8 | 81.5 | 97 |
| 4 | Diisopropylketone | 75 | 1.7 | 30.3 | 4.8 | 82.4 | 98 |
| 5 | Acetophenone | 90 | 0.9 | 22.9 | 4.2 | 82.0 | 96 |
| 6 | Acetylacetone | 120 | 2.0 | 33.9 | 6.2 | 80.6 | 91 |

EXAMPLE 3

A 500-ml. capacity nitrogen-substituted four-necked flask was equipped with a stirrer, an ethylene gas inlet tube, a thermometer and a dropping funnel. Each indicated amount of chlorobenzene was poured into the flask as the solvent, and to which 5 millimols of titanium tetrachloride were added at room temperature, followed by the addition of specified amine in the amount indicated in Table 3. The reactants were reacted for 15 minutes under thorough stirring, and thereafter ethylene gas was blown into the reactor. While the temperature inside the flask was maintained at 0° C., ethylaluminum dichloride in the amount indicated in Table 3 was added to the system through the dropping funnel, thus performing the oligomerization reaction of ethylene for the time indicated in Table 3, under agitation. The results are also given in Table 3 below.

TABLE 3

| Run No. | Amines | Amt. (mmol) | Ethylaluminum dichloride (mmol) | Solvent (ml.) | Polymerization reaction time (min.) | Total yield (g.) | Selectivity (percent) | | Linearity (percent) |
|---|---|---|---|---|---|---|---|---|---|
| | | | | | | | $-C_6$ | $C_8-C_{20}$ | |
| 1 | n-Butylamine | 10 | 25 | 100 | 60 | 20.0 | | 70.5 | 91 |
| 2 | Aniline | 10 | 25 | 100 | 120 | 70.8 | 1.5 | 76.7 | 93 |
| 3 | p-Nitroaniline | 10 | 25 | 100 | 120 | 65.9 | 1.5 | 66.5 | 89 |
| 4 | p-Toluidine | 10 | 25 | 100 | 120 | 48.0 | 1.0 | 62.0 | 89 |
| 5 | p-Amino-benzoic acid | 10 | 25 | 100 | 120 | 92.6 | 3.0 | 68.5 | 89 |
| 6 | N-methyl aniline | 10 | 25 | 100 | 120 | 51.0 | 2.4 | 67.1 | 90 |
| 7 | Trimethyl amine | 10 | 25 | 100 | 120 | 33.1 | 1.9 | 71.0 | 90 |
| 8 | Pyrrole | 2.5 | 10 | 200 | 60 | 40.0 | 3.1 | 73.2 | 90 |
| 9 | Piperidine | 2.5 | 10 | 200 | 60 | 41.7 | 2.9 | 72.8 | 90 |
| 10 | 2-chloropyridine | 5 | 15 | 200 | 60 | 50.8 | 3.3 | 74.9 | 90 |
| 11 | Pyridine | 5 | 15 | 200 | 60 | 42.7 | 3.2 | 71.4 | 91 |
| 12 | Piperazine | 1.3 | 10 | 200 | 60 | 41.2 | 2.3 | 71.1 | 91 |

EXAMPLE 4

A nitrogen-substituted, 300-ml. capacity glass reactor equipped with a stirrer an ethylene gas inlet tube and a thermometer was charged with 100 ml. of chlorobenzene as the solvent, and into which 5 millimols of titanium tetrachloride were dissolved. The temperature inside the reactor was lowered to approximately $-50°$ C. and then 5 millimols of the esters specified in Table 4 were added to the system in each run, followed by 15 minutes reaction under thorough stirring. Then 10 millimols of ethylaluminum dichloride were added to form a catalyst system. Ethylene was introduced into the reactor at a pressure slightly higher than the atmospheric level. The temperature was gradually raised, and the ethylene polymerization are performed at $0°$ C. The results were given also in Table 4.

TABLE 4

| Run No. | Esters | Polymerization reaction time (min.) | Yields (g.) | | | Selectivity for $C_8-C_{20}$ (percent) | Linearity (percent) |
|---|---|---|---|---|---|---|---|
| | | | $-C_6$ | $C_8-C_{20}$ | $C_{22}-$ | | |
| 1 | Ethyl acetate | 120 | 2.7 | 44.7 | 18.2 | 68.1 | 92 |
| 2 | Phenyl acetate | 120 | 3.9 | 49.7 | 9.8 | 78.4 | 94 |
| 3 | 2,6-dimethylphenyl acetate | 120 | 3.0 | 58.3 | 8.3 | 83.8 | 94 |
| 4 | Diethyl oxalate | 120 | 1.8 | 61.5 | 21.8 | 72.2 | 90 |
| 5[1] | Di-n-butyl phthalate | 120 | 1.8 | 5.28 | 8.9 | 83.1 | 92 |

[1] In Run No. 5, 2.5 millimols of di-n-butyl phthalate were used, and 10 millimols of ethylaluminum dichloride was replaced by the same amount of butylaluminum dichloride.

EXAMPLE 5

A nitrogen-substituted, 600-ml. capacity glass reactor equipped with a stirrer, an ethylene gas inlet tube and a thermometer was charged with 350 ml. of chlorobenzene as the solvent, and in which 7.5 millimols of titanium tetrachloride were dissolved. Then 3.75 millimols of the nitriles specified in Table 5 below were added to the system in each run, followed by approximately 5 minute thorough stirring at $30°$ C. Thereafter the temperature inside the reactor was again lowered to approximately $-5°$ C. Fifteen (15) millimols of ethylaluminum dichloride was added to the system to form the catalyst. Then ethylene gas was introduced into the reactor at a pressure slightly higher than the atmospheric level, and the temperature was gradually raised to $0°$ C. Ethylene polymerization for the time specified in Table 5 was performed at $0°$ C., with the results as given in the same table.

TABLE 5

| Run No. | Nitriles | Polymerization reaction time (min.) | Yields (g.) | | | Selectivity for $C_8-C_{20}$ (percent) | Linearity (percent) |
|---|---|---|---|---|---|---|---|
| | | | $-C_6$ | $C_8-C_{20}$ | $C_{22}-$ | | |
| 1 | Acetonitrile | 60 | 7.9 | 79.5 | 8.6 | 81.1 | 94 |
| 2 | Valeronitrile | 60 | 7.5 | 72.8 | 11.7 | 79.1 | 90 |
| 3 | Acrylonitrile | 60 | 7.7 | 70.0 | 6.3 | 83.3 | 95 |
| 4 | Benzonitrile | 60 | 5.1 | 55.2 | 10.7 | 77.7 | 94 |
| 5 | Malonitrile | 60 | 6.4 | 61.5 | 9.1 | 79.8 | 94 |
| 6 | Adiponitrile | 60 | 5.0 | 56.4 | 14.6 | 74.2 | 91 |

EXAMPLE 6

The same reactor as employed in Example 3 was used, and procedures of Example 3 were repeated except that the ethers specified in Table 6 were used in each run instead of amines, 100 ml. of chlorobenzene was used as the solvent, and 15 millimols of ethylaluminum dichloride were used. The ethylene oligomerization was continued for 120 minutes in every run, with the results as given in Table 6.

TABLE 6

| Run No. | Ethers | Amt. (mmol) | Total yield (g.) | Selectivity (percent) | | Linearity (percent) |
|---|---|---|---|---|---|---|
| | | | | $C_4-C_6$ | $C_8-C_{20}$ | |
| 1 | Ethyl ether | 5 | 74.2 | 3.3 | 68.9 | 93 |
| 2 | Anisole | 5 | 75.3 | 3.8 | 67.1 | 92 |
| 3 | Allyl ethyl ether | 5 | 83.1 | 2.8 | 70.2 | 96 |
| 4 | Diethylene glycol dimethyl ether | 2.5 | 74.0 | 3.1 | 64.7 | 93 |
| 5 | Tetrahydrofuran | 5 | 67.2 | 3.5 | 69.3 | 93 |
| 6 | Dioxane | 2.5 | 78.2 | 3.0 | 66.8 | 93 |

EXAMPLE 7

In the same reactor as employed in Example 3, an organic sulfur compound specified in Table 7 was reacted as the electron donor, with titanium tetrachloride at $50-60°$ C. for 30 minutes, in 100 ml. of chlorobenzene as the solvent. Thereafter ethylene gas was introduced into the reactor, and while the inner temperature of the reactor was maintained at 0° C., the indicated amount of ethylaluminum dichloride was added to the system through the dropping funnel. Thus the ethylene oligomerization reaction was performed at 0° C. under violent stirring. Experiments were also carried out using the organic sulfur compound as the electron donor concurrently with other types of electron donors. The conditions for catalyst preparation, oligomerization of ethylene, and results of the experiments are given in Table 7 below.

atoms per one aluminum atom ranges 1.8–2.8, can be effectively used for the preparation of the catalysts useful for the subject process. Furthermore, it is also demonstrated that when the ratio of bonded halogen atoms per one aluminum atom in the mixture is less than 1.8 or more than 2.8, the resulting catalysts exhibit markedly reduced catalytic activity.

Titanium tetrachloride and electron doner were reacted in chlorobenzene as the solvent to form a complex com-

TABLE 7

| Run No. | Electron donor | Amt. (mmol) | TiCl$_4$ (mmol) | Ethylaluminum dichloride (mmol) | Polymerization reaction conditions | | Total yield (g.) | Selectivity (percent) | | Linearity (percent) |
|---|---|---|---|---|---|---|---|---|---|---|
| | | | | | Time (min.) | Pressure (kg./cm.$^2$) | | C$_4$–C$_6$ | C$_8$–C$_{20}$ | |
| 1 | Ethyl mercaptan | 5 | 5 | 15 | 120 | (¹) | 76.5 | 13.1 | 79.8 | 90 |
| 2 | Thiophenol | 5 | 5 | 15 | 120 | (¹) | 72.8 | 15.2 | 79.1 | 91 |
| 3 | Ethyl sulfide | 5 | 5 | 15 | 120 | (¹) | 83.9 | 8.3 | 71.4 | 90 |
| 4 | Phenyl sulfide | 5 | 5 | 15 | 120 | (¹) | 72.1 | 9.8 | 69.5 | 91 |
| 5 | Phenyl disulfide | 0.1 | 5 | 15 | 120 | (¹) | 60.4 | 9.1 | 79.0 | 89 |
| 6 | Dimethylsulfoxide | 5 | 5 | 15 | 120 | (¹) | 83.6 | 9.5 | 71.5 | 90 |
| 7 | Divinyl sulfone | 5 | 5 | 15 | 120 | (¹) | 70.5 | 12.9 | 67.3 | 89 |
| 8 | Diphenyl sulfone | 5 | 5 | 15 | 120 | (¹) | 71.2 | 8.1 | 70.6 | 89 |
| 9 | Thiourea | 5 | 5 | 15 | 120 | (¹) | 185.0 | 7.1 | 74.3 | 90 |
| 10 | Dipentamethylenethiuram tetrasulfide | 2.5 | 5 | 15 | 120 | (¹) | 54.2 | 21.5 | 67.2 | 89 |
| 11 | Thiophene | 5 | 5 | 15 | 120 | (¹) | 82.6 | 11.5 | 67.1 | 90 |
| 12 | 2-mercaptobenzothiazole | 5 | 5 | 15 | 120 | (¹) | 70.2 | 11.3 | 68.9 | 91 |
| 13 | Cyclohexyl benzothiazyl sulpheneamide | 1.25 | 5 | 15 | 120 | (¹) | 74.9 | 6.0 | 68.3 | 91 |
| 14 | Thiuracil | 5 | 5 | 15 | 120 | (¹) | 59.4 | 4.2 | 68.2 | 90 |
| 15 | {Ethyl mercaptan / Pyridine} | 1 / 1 | 2 | 10 | 60 | 10 | 54.7 | 9.5 | 72.7 | 94 |
| 16 | {Isopropyl mercaptan / Pyridine} | 1 / 2 | 2 | 10 | 60 | 10 | 72.5 | 23.5 | 66.3 | 94 |
| 17 | {Thiophenol / α-Naphthyl amine} | 1 / 3.5 | 5 | 25 | 120 | (¹) | 86.0 | 6.6 | 69.8 | 91 |
| 18 ² | {Phenyl disulfide / Acetyl acetone} | 0.02 / 1 | 2 | 6 | 60 | 10 | 49.1 | 19.4 | 70.2 | 93 |

¹ Atmospheric.
² One-hundred (100) ml. of toluene were used in place of 100 ml. of chlorobenzene.

EXAMPLE 8

In this example, it is demonstrated that, instead of alkyl aluminum dihalide, mixtures of various aluminum halides such as trialkyl aluminum, dialkyl aluminum halide, alkyl aluminum sesquihalide, alkyl aluminum dihalide, and aluminum trihalide, in which the ratio of bonded halogen pound, and to which a mixture of organo-aluminum compounds of the composition specified in Table 8 was added in each run, to provide a catalyst. Each catalyst was used in the polymerization of ethylene for 2 hours, with the results given also in Table 8.

TABLE 8

| Run No. | Aluminum compounds | Amount (mmol) | Halogen/Al | TiCl$_4$ (mmol) | Electron donor | Amount (mmol) | Total yield (g.) | Selectivity (percent) | | Linearity (percent) | Other reaction condition |
|---|---|---|---|---|---|---|---|---|---|---|---|
| | | | | | | | | –C$_6$ | C$_8$–C$_{20}$ | | |
| 1 | {Triethylaluminum / Diethylaluminum chloride / Aluminum chloride} | 3 / 1 / 6 | 1.9 | 5 | Triethyl phosphine | 5 | 55.8 | 2.7 | 86.2 | 91 | Same to Ex. 1. |
| 2 | {Diethylaluminum chloride / Ethylaluminum dichloride} | 1 / 9 | 1.9 | 5 | do | 5 | 50.9 | 2.0 | 84.5 | 94 | Do. |
| 3 | {Triethylaluminum / Aluminum chloride} | 5 / 9 | 1.93 | 5 | Aniline | 10 | 81.0 | 1.3 | 79.0 | 91 | Same to Ex. 3 |
| 4 | {Ethylaluminum dichloride / Ethylaluminum sesquichloride} | 10 / 5 | 1.83 | 5 | do | 10 | 43.5 | 0.8 | 60.9 | 94 | Do. |
| 5 | {Diethylaluminum bromide / Aluminumhchloride} | 8 / 10 | 2.11 | 5 | do | 10 | 76.7 | 2.1 | 70.0 | 90 | Do. |
| 6 | {Dibutylaluminum chloride / Aluminum chloride} | 8 / 10 | 2.11 | 5 | do | 10 | 68.8 | 2.1 | 72.5 | 91 | Do. |
| 7 | {Triethylaluminum / Diethylaluminum chloride / Aluminum chloride} | 4.5 / 1.5 / 9 | 1.9 | 7.5 | Acrylonitrile | 3.75 | 54.2 | 3.1 | 84.8 | 94 | Same to Ex. 5 |
| 8 | {Diethylaluminum chloride / Ethylaluminum dichloride} | 1.5 / 13.5 | 1.9 | 7.5 | do | 3.75 | 74.0 | 5.3 | 77.9 | 94 | Do. |
| 9 | {Ethylaluminum dichloride / Aluminum chloride} | 5 / 10 | 2.67 | 5 | Ethyl ether | 5 | 55.1 | 8.9 | 68.9 | 85 | Same to Ex. 6 |
| 10 | {Diethylaluminum chloride / Ethylaluminum dichloride} | 5 / 10 | 1.67 | 5 | do | 5 | 58.0 | 5.0 | 51.0 | 90 | Do. |
| 11 | {Ethylaluminum dichloride / Aluminum chloride} | 2 / 12 | 2.86 | 5 | do | 5 | 25.3 | 6.8 | 54.9 | <80 | Do. |
| 12 | {Diethylaluminum chloride / Ethylaluminum dichloride} | 5 / 10 | 1.67 | 5 | Phenyl sulfide | 5 | 81.0 | 5.5 | 32.7 | <80 | Same to Ex. 7 |

Control

The same reactor as employed in Example 1 was charged with 100 ml. of chlorobenzene as the solvent, and into which 5 millimols of titanium tetrachloride, 10 millimols of the electron donor specified in Table 9 below, and 15 millimols of ethylaluminum dichloride were added simultaneously. After 15 minute stirring at −20° C., ethylene was fed into the system, to be oligomerized at 0° C. The results are given also in Table 9.

num compounds varied in each run as indicated in Table 11 below. The results are given in the same table.

TABLE 11

| Run No. | Amines and amounts (m.mol) | Al/Ti | Polymerization time (min.) | Total yield (g.) | Selectivity (percent) | | Linearity (percent) |
|---|---|---|---|---|---|---|---|
| | | | | | −$C_6$ | $C_8$-$C_{20}$ | |
| 1 | α-Naphthylamine (1.5) | 3 | 120 | 89.0 | 1.8 | 63.3 | 90 |
| 2 | α-Naphthylamine (5) | 5 | 120 | 80.3 | 1.5 | 67.9 | 91 |
| 3 | α-Naphthylamine (15) | 5 | 120 | 71.0 | 1.9 | 66.9 | 90 |
| 4 | p-Aminobenzoic acid (20) | 10 | 120 | 90.3 | 3.2 | 72.5 | 88 |

EXAMPLE 11

A 300-ml. capacity autoclave was evacuated and filled with argons, and charged with 150 ml. of chlorobenzene as the solvent. In the autoclave 2 millimols of titanium tetrachloride and triethyl phosphine were charged. After thorough stirring, 3 millimols of ethylaluminum dichlo-

TABLE 9

| Run No. | Electron donors | Polymerization reation time (min.) | Yield (g.) | | | Selectivity for $C_8$-$C_{20}$ (percent) | Linearity (percent) |
|---|---|---|---|---|---|---|---|
| | | | −$C_6$ | $C_8$-$C_{20}$ | $C_{22}$— | | |
| 1 | Triethyl phsophine | 45 | 4.4 | 30.3 | 23.3 | 52.3 | 86 |
| 1 | Dimethyl ketone | 90 | 3.3 | 28.0 | 18.7 | 56.0 | 86 |

Also the inside atmosphere of a 500-ml. capacity, four-necked flask was substituted with nitrogen, and the flask charged with 100 ml. of chlorobenzene as the solvent. In the solvent, 5 millimols of titanium tetrachloride and 15 millimols of ethylaluminum dichloride were mixed, and immediately thereafter 5 millimols of phenyl sulfide were added to the system, followed by 10 minute stirring at 0° C. Then ethylene was fed thereinto and oligomerized for 120 minutes at 0° C. The resulting total yield was 60.7 g., selectivity for $C_8$-$C_{20}$ olefins was 53.8%, and linearity was 87%.

EXAMPLE 9

In this example, the type of solvent used was varied in each run to examine the significance of solvent to the reaction. The results are given in Table 10 below.

ride were added, followed by blowing of ethylene gas into the system under agitation. The ethylene oligomerization was performed at an elevated pressure of 30 kg./cm.$^2$ gauge and 0° C. for 30 minutes. The total yield was 50 g., 23.1% thereof being olefins of not more than 6 carbons, 68.5% thereof being olefins of 8 to 20 carbons, and 8.4% thereof being olefins of not less than 22 carbons. The linearity of the product was 95%.

EXAMPLE 12

A 300-ml. capacity autoclave as employed in Example 11 was charged with 100 ml. of chlorobenzene, and to which 2 millimols of titanium tetrachloride, and subsequently phenyl sulfide, were added, followed by 10 minute stirring at room temperature. Then the system was cooled to 0° C., ethylaluminum dichloride was added,

TABLE 10

| Run No. | Solvent | Electron donors | Total yield (g.) | Selectivity (percent) | | Linearity (percent) | Reaction condition |
|---|---|---|---|---|---|---|---|
| | | | | $C_4$-$C_6$ | $C_8$-$C_{20}$ | | |
| 1 | Toluene | Triethyl phosphine | 56.6 | 6.9 | 78.1 | 96 | Same to Ex., 1. |
| 2 | 1,2-dichloroethane | do | 67.0 | 6.1 | 80.6 | 97 | Do. |
| 3 | Toluene | Diethyl ketone | 25.0 | 6.8 | 78.4 | 94 | Same to Ex., 2. |
| 4 | Carbon tetrachloride | do | 18.0 | 0.9 | 88.0 | 92 | Do. |
| 5 | Dichloromethane | Phenyl acetate | 93.8 | 4.3 | 80.0 | 94 | Same to Ex., 4. |
| 6 | Bromobenzene | do | 75.5 | 3.3 | 75.1 | 95 | Do. |
| 7 | Toluene | Acrylonitrile | 70.0 | 7.3 | 76.6 | 94 | Same to Ex., 5. |
| 8 | do | Ethyl ether | 75.7 | 3.0 | 65.0 | 95 | Same to Ex., 6. |
| 9 | Ethylene dichloride | do | 118.5 | 3.9 | 73.1 | 87 | Do. |
| 10 | Trichloroethylene | do | 80.1 | 3.6 | 69.1 | 91 | Do. |
| 11 | Toluene | Phenyl sulfide | 65.3 | 8.3 | 72.7 | 93 | Same to Ex., 7. |
| 12 | Xylene | do | 60.2 | 9.9 | 70.9 | 92 | Do. |

EXAMPLE 10

In this example, the significance of the quantity of electron donor and molar quantity of aluminum compound per mol of titanium tetrachloride in the reaction were examined.

Using the same apparatus as employed in Example 3 and 100 ml. of ethylene dichloride as the solvent, the catalyst preparation and ethylene oligomerization described in Example 3 were repeated, with the type and quantity of electron donors used and quantity of alumiand ethylene was oligomerized therein for 2 hours at an elevated pressure of 10 kg./cm.$^2$ gauge. The amounts of phenyl sulfide and ethylaluminum dichloride were varied in each run to examine the correlation of the amounts with the reaction results.

Also as controls, the reaction was repeated except that a binary catalyst system composed of titanium tetrachloride and ethylaluminum dichloride was used instead of the ternary catalyst system of the invention, which was similarly prepared as above but addition of phenyl sulfide was omitted. The control results are concurrently given in the Table 12 below.

TABLE 12

| Run No. | Phenyl sulfide (m.mol) | Ethylaluminum dichloride (m.mol) | Polymerization temp. (° C.) | Total yield (g.) | Selectivity (percent) | | Linearity (percent) |
|---|---|---|---|---|---|---|---|
| | | | | | $C_4$-$C_6$ | $C_8$-$C_{20}$ | |
| 1 | 2 | 3 | 10 | 80 | 4.9 | 75.2 | 97 |
| 2 | 2 | 2 | 10 | 65 | 3.5 | 76.8 | 98 |
| 3 | 2.2 | 2 | 10 | 75 | 3.7 | 76.9 | 98 |
| 4 | 2 | 6 | 0 | 90 | 2.9 | 72.4 | 93 |
| 5 (Control) | | 3 | 10 | 62.7 | 2.0 | 40.7 | 83 |
| 6 (Control) | | 2 | 10 | 49.5 | 1.6 | 42.3 | 85 |
| 7 (Control) | | 6 | 0 | 82.0 | 2.1 | 47.1 | 87 |

EXAMPLE 13

The same reactor used in Example 12 was employed, which was charged with 100 ml. of chlorobenzene as the solvent, and then with 5 millimols each of titanium tetrachloride and triethyl phosphine, followed by stirring. Then 15 millimols of ethylaluminum dichloride were added to the system to form a catalyst.

The catalyst was used for ethylene polymerization, with the reaction temperature, pressure, and time varied in each run as indicated in Table 13 below. The results are given also in the same table.

TABLE 13

| Run No. | Reaction conditions | | | Yield (g.) | | | Selectivity for $C_8$-$C_{20}$ (percent) | Linearity (percent) |
|---|---|---|---|---|---|---|---|---|
| | Temp. (° C.) | Pressure (kg./cm.²/g.) | Time (min.) | —$C_6$ | $C^8$-$C_{20}$ | $C_{22}$— | | |
| 1 | 0 | 17 | 20 | 1.9 | 39.3 | 14.8 | 70.2 | 99 |
| 2 | 0 | 5 | 55 | 6.2 | 87.5 | 13.3 | 81.8 | 99 |
| 3 | 0 | 0 | 90 | 2.3 | 60.0 | 6.9 | 86.9 | 94 |
| 4 | −20 | 0 | 90 | 2.1 | 26.8 | 2.1 | 86.5 | 97 |
| 5 | +30 | 0 | 90 | 1.7 | 24.5 | 4.9 | 78.8 | 88 |
| 6 | +50 | 0 | 90 | 1.8 | 12.0 | 4.9 | 64.2 | 77 |

We claim:

1. A process for the preparation of higher olefins by oligomerization of ethylene, which comprises contacting ethylene with a catalyst in a solvent selected from the group consisting of hydrocarbons and halogenated hydrocarbons, at a temperature of from −30° C. to +80° C., said catalyst being prepared by (1) reacting titanium tetrachloride with 0.1–5 mols of at least one nitrile selected from the group consisting of mononitriles represented by the formula R—CN and dinitriles represented by the formula NC—Z—CN, wherein R is an alkyl group of 1 to 5 carbon atoms, an alkenyl group of 2 to 4 carbon atoms or an aryl group of 6 to 8 carbon atoms, and Z is an alkylene group of 1 to 3 carbon atoms, per mol of titanium tetrachloride, and (2) mixing the reaction product of (1) with an aluminum alkyl halide component containing 1.8 to 2.8 bonded halogen atoms per aluminum atom.

2. The process of claim 1, wherein 0.3 to 50 mols of said aluminum alkyl halide per mol of titanium tetrachloride is mixed with the reaction product of (1).

3. The process of claim 1, wherein ethylene is contacted with said catalyst at a pressure within the range of atmospheric pressure to 50 kg./cm.².

4. The process of claim 1, wherein said solvent is a halogenated aromatic hydrocarbon.

5. The process of claim 1, wherein said solvent is an aromatic hydrocarbon.

6. The process of claim 1, wherein said aluminum alkyl halide component comprises at least one member of the group consisting of trialkyl aluminum, dialkyl aluminum halide, alkyl aluminum sesquihalide, alkyl aluminum dihalide, and aluminum trihalide.

References Cited

UNITED STATES PATENTS

| 3,069,446 | 12/1962 | Argabright et al. | 260—94.9 X |
| 3,574,782 | 4/1971 | Bearden et al. | 260—683.15 |
| 3,584,071 | 6/1971 | McNulty et al. | 260—683.15 |
| 3,081,287 | 3/1963 | Coover et al. | 260—93.7 |
| 3,108,145 | 10/1963 | Antonsen | 260—683.15 |
| 3,379,706 | 4/1968 | Wilke | 260—683.15 X |
| 3,441,630 | 4/1969 | Langer et al. | 260—683.15 |

PAUL M. COUGHLAN, JR., Primary Examiner

U.S. Cl. X.R.

252—429 B; 260—94.9 CA